Patented Apr. 28, 1925.

1,535,450

UNITED STATES PATENT OFFICE.

WALLACE L. CHANDLER, OF EAST LANSING, MICHIGAN.

IODINE AND PROCESS OF MAKING THE SAME.

No Drawing.   Application filed March 16, 1923.   Serial No. 625,670.

*To all whom it may concern:*

Be it known that I, WALLACE L. CHANDLER, a citizen of the United States, residing at East Lansing, county of Ingham, State of Michigan, have invented certain new and useful Improvements in Iodine and Processes of Making the Same, of which the following is a specification.

This invention relates to an improved iodine and the process of making the same.

The object of the invention is to produce a crystalline iodine that is immediately soluble in water, oils, alcohols and other solvents of iodine, rendering free iodine economically and immediately available in strengths sufficient for medication and disinfectant purposes without the aid of iodides or other salts of iodine.

Objects pertaining to details and economies of the product and process will definitely appear from the detailed description to follow.

I accomplish the objects of my invention by the devices, and means and processes described in the following specification. The invention is clearly defined and pointed out in the claims.

Pure crystalline iodine ($I_2$) as obtained on the market goes into solution in water so slowly that it requires days or even weeks before a sufficient strength is obtained to be effective as a disinfectant in the destruction of worm eggs and larvæ, on surfaces such as the hair and body of domestic animals, the floor and walls of animal pens and the surface of soils. Even after the above iodine ($I_2$) has stood for several months in water, I have been unable to obtain a solution of sufficient concentration to destroy encapsulated hookworm larvæ when these were placed directly into the solution.

The object of this invention is to produce a crystalline iodine which will immediately go into solution in water giving sufficient strengths to instantly destroy worm eggs and larvæ, and various yeasts, moulds, bacteria and protozoa on surfaces as described above.

Furthermore, pure crystalline iodine ($I_2$) goes into solution in castor oil very slowly, even when powdered, and is given up by the oil slowly. The object of this invention is to produce a crystalline iodine that will go into solution in castor oil readily, and will be liberated from the castor oil rapidly enough to destroy hookworms and other roundworms in the intestines of animals which have been dosed with the castor oil solution.

I accomplish these objects by the production of a crystalline iodine through the rapid and vigorous oxidation of fairly concentrated hydriodic acid by the action of a fairly concentrated hypohalous acid:

*Equation No. 1.*

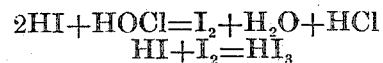

Or using hypoiodous acid instead of hypochlorous acid:

*Equation No. 2.*

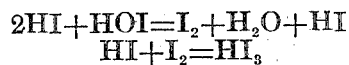

My improved product may, therefore, be prepared from fairly concentrated solutions of alkali-metal iodides by first treating them with an excess of a sufficient amount of an acid to convert them into hydriodic acid and salts of the added acid as illustrated by the following equation:

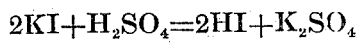

and then rapidly introducing into the solution a sufficient quantity of a filtered saturated solution of chlorinated lime to immediately precipitate the maximum quantity of iodine crystals. The chlorinated lime is at once acted on by the excess of the acid resulting in the formation of hydrochlorous acid, calcium salts of the acid employed, calcium chloride and water, the probable reactions being as follows:

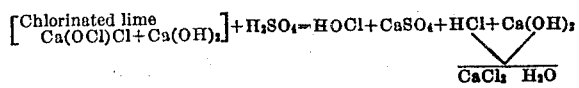

The hypochlorous acid then reacting with the hydriodic acid according to the above Equation No. 1.

Or the process may be rendered more economical by the direct acidification of a fairly concentrated solution of a freshly prepared iodated lime. The principal reacting chemicals in this solution apparently are calcium iodide and calcium hypoiodite. On acidification the calcium iodide yields hydriodic acid, and the calcium hypoiodite yields hypoiodous acid:

The latter immediately vigorously oxidizes the hydriodic acid; the reactions being as indicated by the above Equation No. 2, yielding my improved iodine.

The reactions are essentially the same whatever hypohalous acid is employed, the process depending on the rapid and vigorous oxidation of hydriodic acid by hypohalous acids, and this is accomplished by bringing into contact with each other fairly concentrated solutions of these two acids.

My improved product differs from pure iodine ($I_2$) as obtained on the market in the following details:

1. It appears to be more vigorous in its reactions.

2. It goes into solution more readily in water, castor oil and many other solvents of iodine, giving a .03 to .04% solution in water within a few seconds.

3. Due to its more vigorous activity it requires appreciably less concentrated water solutions to destroy worm eggs and worms and microorganisms than is required where water solutions of either pure iodine ($I_2$), Lugol's solution or tinctures are employed.

These greater activities of my product together with the fact that vigorous oxidation is required to produce it indicate that in my improved product I have a more concentrated iodine molecule; the hydrogen is stripped so rapidly from $2HI_3$ that iodine is immediately precipitated as $2I_3$. It appears, therefore, that my improved crystalline iodine may be properly designated as "$I_3$".

Having thus described my invention what I claim as new and desire to secure by Letters Patent is:

1. The process of producing iodine crystals consisting in the treatment of fairly concentrated acidified solutions of alkalimetaliodides with fairly concentrated solutions of chlorinated lime, bringing about a vigorous oxidation of these acidified strong solutions resulting in the formation of crystalline iodine, as described.

2. The process involving the rapid and vigorous oxidation of fairly strong solutions of hydriodic acid by the action of a concentrated solution of hypohalous acid, resulting in the formation of crystalline iodine, as described.

3. The acidification of fairly concentrated solutions of mixtures of alkali iodides and hypohalous acids, resulting in the formation of crystalline iodine having the properties described.

4. Iodine crystals, as specified, readily soluble in water, castor oil, etc., and vigorously active as a medicament and disinfectant.

5. A crystalline iodine substance prepared by the process involving rapid and vigorous oxidation of fairly strong solutions of hydriodic acid by the action of concentrated solutions of hypohalous acid, and having the above described properties.

6. A crystalline iodine substance prepared by the process involving acidification of fairly concentrated solutions of mixtures of alkali iodides and hypohalous acids, and having the above described properties.

In witness whereof, I have hereunto set my hand and seal.

WALLACE L. CHANDLER. [L. S.]